US007807256B2

(12) United States Patent
Zhou et al.

(10) Patent No.: US 7,807,256 B2
(45) Date of Patent: Oct. 5, 2010

(54) TONER RECEIVING COMPOSITION

(75) Inventors: Xiaoqi Zhou, San Diego, CA (US); Richard J. McManus, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 855 days.

(21) Appl. No.: 11/700,577

(22) Filed: Jan. 30, 2007

(65) Prior Publication Data

US 2008/0182188 A1 Jul. 31, 2008

(51) Int. Cl.
*B32B 7/02* (2006.01)

(52) U.S. Cl. ....................... 428/212; 428/216; 428/325; 428/327; 428/330; 428/423.1; 428/500

(58) Field of Classification Search ................. 428/212, 428/216, 325, 327, 330, 423.1, 500
See application file for complete search history.

(56) References Cited

U.S. PATENT DOCUMENTS 5,086,209 A 2/1992 Kintz et al.
5,342,718 A * 8/1994 Nousho et al. ............. 430/59.6
5,837,351 A 11/1998 Chernovitz et al.
5,885,698 A * 3/1999 Takehana et al. ............ 428/212
5,888,689 A 3/1999 De Meutter et al.
6,091,755 A 7/2000 Sanders et al.
6,177,222 B1 1/2001 McAneney et al.
6,242,047 B1 6/2001 Johnson et al.
6,544,709 B1 4/2003 Wang et al.
2003/0044625 A1* 3/2003 Goto .......................... 428/480
2003/0103122 A1 6/2003 Missell et al.
2003/0103129 A1 6/2003 Tanaka et al.
2007/0031753 A1* 2/2007 Abe et al. ................... 430/125

FOREIGN PATENT DOCUMENTS

EP 0821280 A1 1/1998
EP 0778156 B1 4/2001
JP 07-12096 5/1995
JP 17319612 A 11/2005
KR 10-20050003754 A 1/2005

* cited by examiner

*Primary Examiner*—Betelhem Shewareged

(57) ABSTRACT

In one aspect of the present system and method, an electrophotographic media includes a base media, at least one sub-layer formed on a first side of the base media, and an image receiving layer formed on the at least one sub-layer, wherein the image receiving layer includes a cross-linked resin coating structure.

13 Claims, 3 Drawing Sheets

TONER RECEIVING COMPOSITION

BACKGROUND

With the rapid development of digital image technology, traditional monochromatic electrophotographic printing is gradually being replaced by full color, high image quality electrophotographic printing. Electrophotographic printing technology enables the making of good quality in-house prints on-demand without requiring professional skills such as those skills used to perform conventional offset printing (lithographic printing) in a printing house.

The print quality of full color electrophotographic printing operations has traditionally been limited by characteristics of the print media, which is typically uncoated paper. To enhance the image quality of color electrophotographic printing, a coated print media such as coated paper designed for electrophotographic printing can be used. These coated print media are typically coated with inorganic pigment compositions and other functional materials configured to promote toner transfer and overall image quality. Additionally, these and other traditional print media coatings as well as traditional coatings processes are used to enhance the gloss and surface smoothness of the uncoated print media. For the coated print media, a calendaring procedure is often used to apply pressure and heat to the media to achieve high gloss and surface smoothness. However these types of coated media have a sheet gloss that is lower than what is necessary for photographic printing applications and often show a reduction in sheet gloss when the toner is fixed by a fuser in an electrophotographic printer.

Often, in order to achieve the desired high gloss and surface smoothness, printing media can be coated with functional materials on the image receiving side such as polyacrylic and polyester polymers. Such materials may, in some instances, be undesirable for some high end electrophotographic printers which employ high temperature and pressure fusing. With high fusing temperatures, the thermoplastic coating on the outermost layer of the media can be altered and gloss is subsequently reduced. Further, these materials may have a lower hardness, which frequently causes surface scratch problem during the printing process and post-usage. Moreover, many of the traditional film-forming coatings are solvent based, which is not environmental friendly in manufacture.

SUMMARY

In one aspect of the present system and method, an electrophotographic media includes a supporting substrate, an inorganic sub layer, and an image receiving layer, wherein the image receiving layer includes a cross-linkable resin coating structure.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

Figure 1:
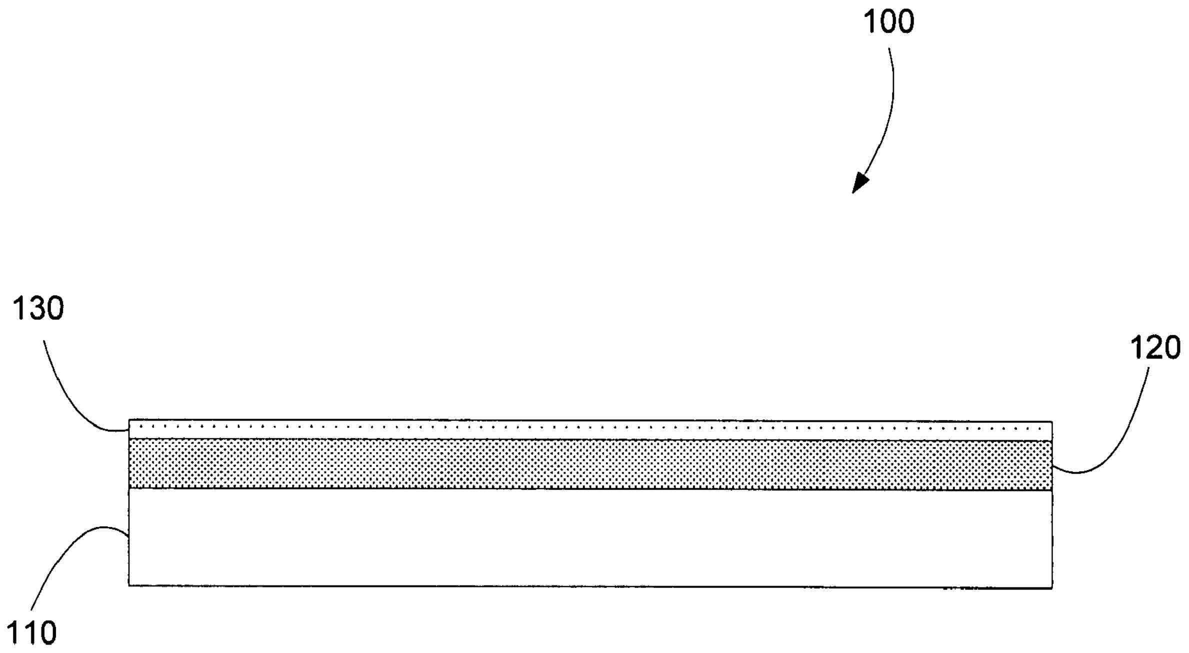
FIG. 1 is a cross-sectional view of a print media, according to one exemplary embodiment.

The present specification discloses an exemplary media coating composition that can be used for making media for electrophotographic printing. More specifically, the present system and method provides a toner receiving composition that includes polymeric materials that can be cross-linked at ambient conditions or elevated temperatures. The resulting media exhibits a high gloss appearance, stable gloss level, and excellent scratch resistance. According to one exemplary embodiment, the toner receiving composition is formed from either cross-linkable styrene maleic anhydride (SMA), including its hydrolyzed acid and partial ester forms or cross-linkable polyurethane. Further details of the present media coating composition and methods for using thereof will be provided below.

Before particular embodiments of the present system and method are disclosed and described, it is to be understood that the present system and method are not limited to the particular process and materials disclosed herein as such may vary to some degree. It is also to be understood that the terminology used herein is used for the purpose of describing particular embodiments only and is not intended to be limiting, as the scope of the present system and method will be defined only by the appended claims and equivalents thereof.

As used in the present specification and in the appended claims, the term "electrophotographic printing" is meant to be understood broadly as including any number of methods that use light to produce a change in electrostatic charge distribution to form a photographic image including, but in no way limited to, laser printing.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In the following description, for purposes of explanation, numerous specific details are set forth in order to provide a thorough understanding of the present system and method for forming a media coating composition for use with electrophotographic printing. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

FIG. 1 illustrates a cross-sectional view of an electrophotographic media (100) according to one exemplary embodimentment. As illustrated in FIG. 1, the exemplary electrophotographic media (100) includes at least three layers: a supporting substrate referred to herein as a base media (110), one or more sub-layers (120) disposed on the base media, and an image receiving layer (130) formed on top of the one or more sub-layers. According to the present exemplary embodiment, the sub-layers (120) provide sufficient smoothness to the surface of the base media (110) to generate the desired gloss level on the resulting media (100). The base media (110), the sub-layers (120), and the image receiving layer (130) will now be described in further detail below.

As shown in FIG. 1, the base media (110) forms the supporting structure of the electrophotographic media. The present exemplary electrophotographic media (100) will be described herein, for ease of explanation only, in the context of a polymeric film base media. However, it will be understood by one of ordinary skill in the art that any number of base media materials may be used by the present system and method including, but in no way limited to, polymeric films such as polyester white film or polyester transparent film, cellulosic papers with extruded polymer resins on one side or both sides, cellulosic paper stock, and/or combinations. Furthermore, the substrate may include first and second opposed faces upon which various layer(s) of embodiments of the present disclosure may be established. According to one exemplary embodiment, the base media (110) has a thickness, along substantially the entire length, ranging between about 0.025 mm and about 0.5 mm.

Additionally, any number of fillers may be included in the above-mentioned base media materials during formation of the stock base media (110). According to one exemplary embodiment, the fillers that may be incorporated to control physical properties of the base media (110) include, but are in no way limited to, ground calcium carbonate, precipitated calcium carbonate, titanium dioxide, kaolin clay, and silicates. According to one exemplary embodiment, the fillers represent from approximately 0 to 20% by weight of the stock base media (110). According to another exemplary embodiment, the filler represents from between approximately 5 to 15% by weight of the stock base media (110).

Continuing with FIG. 1, the base media (110) is covered by one or more inorganic sub-layers (120). According to one exemplary embodiment, the inorganic sub-layers (120) are established between the base media (110) and the top image receiving layer (130) to enhance the surface finish of the base media (110). Additionally, according to one exemplary embodiment, the inorganic sub-layers (120) may advantageously supply enhanced opacity, brightness, surface smoothness, and/or color hue to the media. According to one exemplary embodiment, the inorganic sub-layer includes a dry coating of inorganic pigments constituting from about 5 percent to about 95 percent by weight of the inorganic sub-layers (120). Appropriate inorganic pigments include, but are in no way limited to, titanium dioxide, hydrated alumina, calcium carbonate, barium sulfate, silica, high brightness kaolin clays, zinc oxide, and/or combinations thereof.

Additionally, according to one exemplary embodiment, the inorganic sub-layers (120) further include between 5 and 95 percent binder by weight. According to one exemplary embodiment, the binder portion of the inorganic sub-layers (120) is configured to couple the inorganic pigments, thereby forming a single cohesive layer on top of the base media (110). Additionally, according to one exemplary embodiment, the binder component of the inorganic sub-layers (120) couples the sub-layers to the base media (110) and the image receiving layer (130). According to one exemplary embodiment, the binder portion of the inorganic sub-layers (120) may include, but is not limited to, water soluble binders, water dispersible binders, polymeric emulsions exhibiting high binding power for the substrate and the pigments, and/or combinations thereof. Illustrative examples of specific binders suitable for the inorganic sub-layers (120) include, but are in no way limited to, polyvinyl alcohol, starch derivatives, gelatin, cellulose derivatives, acrylamide polymers, acrylic polymers or copolymers thereof, vinyl acetate latex, polyesters, vinylidene chloride latex, styrene-butadiene, acrylonitrile-butadiene copolymers, styrene acrylic copolymers and copolymers and/or combinations thereof.

Continuing with FIG. 1, the image receiving layer (130) is formed on top of the inorganic sub-layers (120) and forms the outmost layer of the resulting media (100). According to one exemplary embodiment, the image receiving layer (130) includes a cross-linkable polymer resin coated structure. Particularly, according to one exemplary embodiment, the image receiving layer (130) includes cross-linkable polyurethane or a cross-linkable SMA resin. Further details of the exemplary cross-linkable polymer resins will be provided below.

According to a first exemplary embodiment, the cross-linkable polymer resin includes a cross-linkable polyurethane resin. According to one exemplary embodiment, the cross-linkable polymer resin includes a hydrophilic polyurethane oligomer such as a water soluble or water dispersible polyurethane oligomer which has two or more reactive functional groups such as hydroxyl or amines, a cross-linker with two or more isocyanate functional groups which may be capped groups. Specifically, polyurethane oligomers appropriate for use in the present exemplary image receiving layer (130) include compounds having urethane bonds obtained by polyaddition reaction between isocyanate or capped isocyanate compounds and diols, triols or polyol/polyamine prepolymers, or combinations thereof.

The isocyanate compounds used for preparing the polyurethane oligomer of the present exemplary image receiving layer (130) may include, but are in no way limited to, isocyanate; toluenediisocyanate; 1,6-hexamethylenediisocyanate; diphenylmethanediisocyanate; 1,3-bis(isocyanatemethyl)cyclohexane; 1,4-cyclohexyldiisocyanate; p-phenylenediisocyanate; 2,2,4(2,4,4)-trimethylhexamethylenediisocyanate; 4,4'-dicychlohexylmethanediisocyanate; 3,3'-dimethyldiphenyl; 4,4'-diisocyanate; m-xylenediisocyanate; tetramethylxylenediisocyanate; 1,5-naphthalenediisocyanate; dimethyltriphenylmethanetetraisocyanate; triphenylmethanetriisocyanate; and/or tris(isocyanatephenyl)thiophosphate.

The diols, triols and polyols used for preparing the polyurethane oligomer of the present exemplary image receiving layer (130) may include, but are in no way limited to the following: 1,4-butanediol; 1,3-propanediol; 1,2-ethanediol; 1,2-propanediol; 1,6-hexanediol; 2-methyl-1,3-propanediol; 2,2-dimethyl-1,3-propanediol or neopentyl glycol; cyclohexanedimethanol; 1,2,3-propanetriol; 2-ethyl-2-hydroxymethyl-1,3-propanediol and/or polyethylene oxides, polypropylene oxides and/or combination thereof. Additionally, compounds containing two or more functional groups, where those functional groups are chosen from hydroxyl, amine or combination thereof can be used to prepare the polyurethane oligomer.

According to one exemplary embodiment, the resulting polyurethane dispersions are based on polyurethane oligomer which was prepared with an NCO/OH equivalent ratio of from 1.2 to 2.2, and in particular from 1.4 to 2.0. Consequently, the resulting polyurethane dispersions are isocyanate-free compounds. The molecular weight of polyurethane oligomer may range from 20,000 to 200,000 as measured by a gel permeation chromatography (GPC). According to on exemplary embodiment, some commercial water dispersible polyurethanes can be used in the present exemplary system and method. For example, according to one exemplary embodiment, polyester based polyurethanes U910, U938 U2101 and U420; polyether based polyurethanes U205, U410, U500 and U400N; polycarbonate based polyurethanes U930, U933, U915 and U911; and Castor oil based polyurethanes CUR21, CUR69, CUR99 and CUR991, all commercially available from Alberdingk Inc., may be used as the oligomer in the present exemplary system and method.

According to one exemplary embodiment, the cross-linking of the above-mentioned polyurethane oligomer to form a cross-linked polyurethane resin is accomplished by reacting the oligomer material with a water dispersible crosslinker. In one exemplary embodiment, the crosslinker is a capped polyisocyanate which has two or more capped reactive isocyanate groups. The capped polyisocyanate may be selected from aliphatic or cyclo-aliphatic or aromatic polyisocyanates. Examples of aliphatic polyisocyanates are polymers of 1,4-tetramethylene diisocyanate and 1,6-hexamethylene diisocyanate, and examples of cyclo polyisocyanates are polymers of isophorone diisocyanate and 4,4'-methylene-bis-(cyclohexyl isocyanate). Examples of aromatic isocyanate polymers are polymers of p-phenylene diisocyanate, diphenylmethane-4, 4'-diisocyanate and 2,4- or 2,6-toluene diisocyanate. Other polyisocyanates such as triphenylmethane-4,4',4"-triisocyanate, 1,2,4-benzene triisocyanate and polymethylene polyphenyl isocyanate are also suitable examples.

To make these polyisocyanate crosslinkers water dispensable, the reactive isocyanate groups are fully capped so that crosslinking reaction with polyurethane oligomer can occur when polyisocyanate is de-capped at elevated temperatures during coating drying process, yielding free isocyanate groups which can react with active hydrogen atoms of the polyurethane oligomer. According to one exemplary embodiment the compound can be used to cap the reactive isocyanate groups include, but not limited to, aliphatic, cycloaliphatic, aromatic mono-alcohol, glycol ethers, phenolic compounds, amines and polyolefin glycols, or mixtures thereof.

Commercially available capped polyisocyanate cross-linkers that may be used in the present exemplary system and method include, but are in no way limited to the commercial Rhodocoat WT 2102, from Rhodia AG; Basonat LR 8878 from BASF; and Desmodur DA and Bayhydur 3100, Bayhydur VP LS 2306, from Bayer. Optionally, a crosslink catalyst such as liquid organ-metal compounds known in the prior arts such as organotin can be used to speed up the crosslink reaction.

According to a further exemplary embodiment, the cross-linkable polymer resin forming the image receiving layer (130) is formed from styrene maleic anhydride (SMA) compounds which include the hydrolyzed acid, ester, and half ester forms of SMA and combinations thereof. According to this exemplary embodiment, the use of styrene maleic anhydride (SMA), particularly higher molecular weight variants such as, by way of example only, Novacote 2000 from Georgia-Pacific, form high gloss and very smooth layers when coated on an inorganic sub-layer (120) based on a supporting stock base media (110). According to one exemplary embodiment, the gloss of these SMA image receiving layers (130) can be as high as 50 gloss units when measured at a 20 degree angle with a gloss meter from Byk-Gardner. Similarly, SMA will form high gloss layers on other smooth substrates such as a photo base substrate, PET film, and the like. However, SMA may produce a media (100) that is relatively brittle and prone to cracking when the stock base media (110 ) is bent or distorted.

A composite film may be formed on the stock base media and the inorganic sub-layer (120), if present, to improve the characteristics of the SMA layer. According to one exemplary embodiment, the brittle characteristics may be reduced without reducing the high gloss properties by forming a composite film made of a combination of SMA with one of amine terminated polyethylene oxide (PEO), polypropylene oxide (PPO), or a copolymer or combination thereof. According to this exemplary embodiment, the addition of amine terminated PEO/PPO compound allows for a toughening of the film by incorporating a less brittle component into cross-linked structure. Cross-linking the SMA through its acid carboxylate functionality with that of the amine function of the amine terminated PEO/PPO compound allows for sheet gloss retention on fusing. The termination can be at both ends of a linear PEO/PPO chain or the PEO/PPO can have a higher amine functionality through branching of the PEO/PPO chain. The PEO/PPO segment of the crosslinked polymer film eliminates the brittle nature of the SMA while retaining the high gloss features.

According to the present exemplary embodiment, the ratio of SMA to amine terminated PEO/PPO can range from 100:1 up to about 2.5:1. Larger ratios of SMA to amine terminated PEO/PPO do not eliminate cracking adequately while lower ratios are tacky and are not able to feed through a printer. Commercially available examples of the amine terminated PEO/PPO compounds that may be combined with SMA according to the present exemplary systems and methods include, but are in no way limited to Jeffamine XTJ-500, Jeffamine XTJ-502, and Jeffamine XTJ D-2000 available from Huntsman Corporation.

According to the present exemplary system and method, the present technology demonstrates improved gloss and smoothness, as well as gloss durability when compared to traditional electrophotographic systems. According to one exemplary embodiment, substrates developed with the present exemplary layer technology exhibit a gloss level greater than 90% at 75 degrees and a gloss level greater than 30% at 20 degrees. Additionally, the present technology is manufactured at similar or lower cost than traditional calendered coated media, cast coated media and the like.

Figure 2:
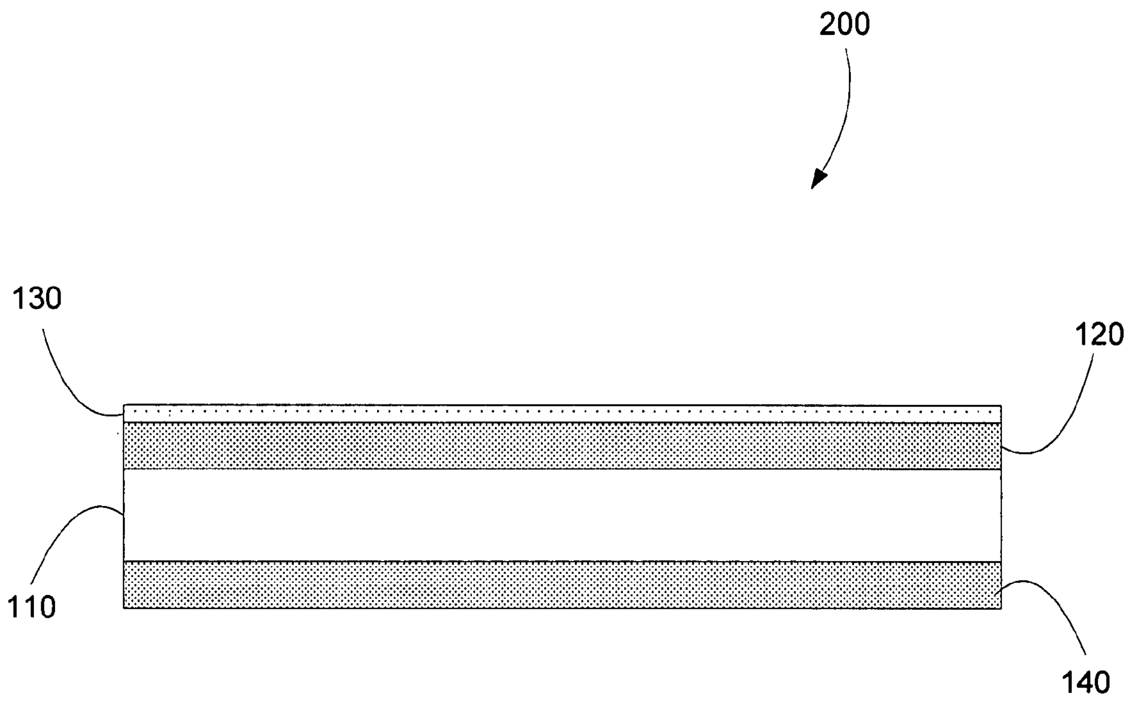
FIG. 2 is a cross-sectional view of a print media including an optional back supporting layer, according to one exemplary embodiment.

FIG. 2 illustrates an alternative electrophotographic media (200) structure, according to one exemplary embodiment. As illustrated in FIG. 2, the exemplary electrophotographic media (200) structure includes at least four components: a supporting base media (110), a number of sub-layers (120) disposed on top of the base media, an image receiving layer (130) formed on top of the sub-layers, and an optional back supporting layer (140) formed on the back surface of the supporting base media (110).

According to one exemplary embodiment the supporting base layer (110), the sub-layers (120), and the image receiving layer (130) are identical to those mentioned above with reference to FIG. 1. However, in contrast to the structure illustrated in FIG. 1, the exemplary structure illustrated in FIG. 2 includes a back supporting layer (140). According to this exemplary embodiment, the back supporting layer (140) may include any number of inorganic pigments, polymer particles, polymeric binders, slipping agents, functional additives and/or combinations thereof. According to one exemplary embodiment, the inorganic pigments formed on the back of the supporting base layer (110) may include, but are in no way limited to calcium carbonate particles. Further, exemplary polymer particles that may be used to form the back supporting layer (140) include, but are in no way limited to, polyethylene beads. Additionally, exemplary slipping agents that may be used in the present exemplary structure include, but are in no way limited to, polymeric wax.

Generally, according to the present exemplary embodiment illustrated in FIG. 2, the back supporting layer (140) may advantageously assist in controlling the friction between sheets and/or between sheets and pick-up rolls of a printing device. Further, the back supporting layer (140) may form an open structure in the media so that moisture vapor may be released from the media without causing blistering under high humidity conditions during toner fusing. Moreover, the above-mentioned back coat serves to balance internal stress from layers established on opposed faces of the substrate, thereby potentially minimizing curling.

Exemplary Formation

Figure 3:
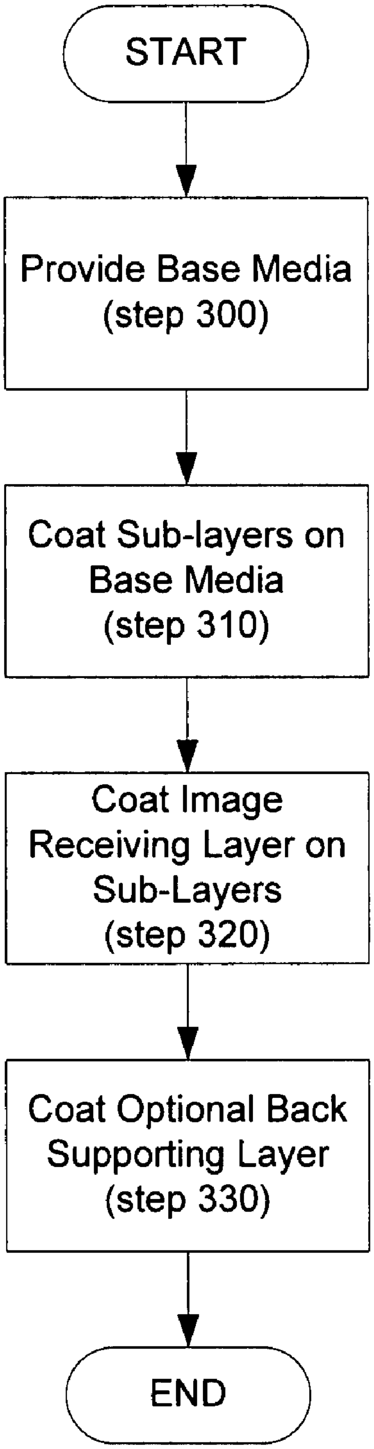
FIG. 3 is a flow chart illustrating a method of forming a print media, according to one exemplary embodiment.

FIG. 3 illustrates an exemplary method for forming the present exemplary electrophotographic media (100), according to one exemplary embodiment. As illustrated in FIG. 3, the present exemplary method begins by first providing the desired base media (step 300). Once provided, the inorganic sub-layers are coated on at least one side of the desired base media (step 310). Once coated, an image receiving layer can be coated on the newly deposited inorganic sub-layers (step 320). Finally, an optional back supporting layer may be formed on the back of the desired base media (step 300). Further details of the above-mentioned media formation method will be described below.

As mentioned, the first step in the present exemplary method includes providing the desired base media (step 300). As mentioned, the desired base media may include, but is in no way limited to, polymeric films such as polyester white film or polyester transparent film, cellulosic papers with extruded polymer resins on one side or both sides, cellulosic paper stock, and/or combinations thereof. According to one exemplary embodiment, the desired base media is provided as a bulk roll of material. Alternatively, the desired base media may be provided in any number of configurations including, but in no way limited to, cut substrates, strips, and/or rolls.

Once provided, the inorganic sub-layers are coated on at least one side of the desired base media (step 310). According to one exemplary embodiment, the inorganic sub-layers are coated onto at least one side of the desired base media using any number of coating methods including, but in no way limited to, blade coating processes, rod coating processes, air-knife coating processes, curtain coating processes, slot coating processes, cast coating processes, extrusion coating processes, transfer coating processes, size press processes, jet coating processes, or combinations thereof.

With the inorganic sub-layers coated on at least one side of the desired base media (step 310), an image receiving layer can be coated on the newly deposited inorganic sub-layers (step 320). Similar to the above-mentioned inorganic sub-layers described above, the image receiving layer may be coated on the inorganic sub-layers using any number of coating methods including, but in no way limited to, blade coating processes, rod coating processes, air-knife coating processes, curtain coating processes, slot coating processes, cast coating processes, extrusion coating processes, transfer coating processes, size press processes, jet coating processes, or combinations thereof. Further, according to one exemplary embodiment, the inorganic sub-layers and the image receiving layers may be applied to the desired base media using an on-machine or off-machine coater.

Finally, an optional back supporting layer may be formed on the back of the desired base media (step 300). Again, the optional back supporting layer may be formed using any number of coating methods including, but in no way limited to, blade coating processes, rod coating processes, air-knife coating processes, curtain coating processes, slot coating processes, cast coating processes, extrusion coating processes, transfer coating processes, size press processes, jet coating processes, or combinations thereof.

According to one exemplary embodiment the inorganic sub-layers, the image receiving layers, and the optional back supporting layers are independently formed and allowed to dry prior to formation of subsequent layers. The deposited layers may be independently cured or dried using any number of known drying methods including, but in no way limited to, convection, conduction, infrared radiation, atmospheric exposure, or a combination thereof.

Alternatively, two or more of the inorganic sub-layers, the image receiving layers, and the optional back supporting layers may be formed on the desired substrate simultaneously using a wet application system. According to this exemplary embodiment, subsequent layers are applied prior to complete curing of previous layers. Once applied and cured, the resulting substrate structure may then be cut an packaged for shipping and subsequent use.

In conclusion, the present exemplary system and method provides a toner receiving composition that includes polymeric materials that can be cross-linked at ambient conditions or elevated temperatures. The resulting media exhibits a stable high gloss appearance through the electophotographic printing process, and excellent scratch resistance.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. An electrophotographic media comprising:

a base media;

at least one sub-layer formed on a first side of said base media; and an image receiving layer formed on said at least one sub-layer;

wherein said image receiving layer includes a composite film comprising a cross-linked resin formed from a combination of styrene maleic anhydride (SMA) cross-linked with amine terminated polyethylene oxide (PEO) or amine-terminated polypropylene oxide (PPO), or a copolymer thereof.

2. The electrophotographic media of claim 1, wherein said at least one sub-layer comprises between 5 percent and 95 percent inorganic pigments by weight.

3. The electrophotographic media of claim 1, wherein said SMA comprises one of a hydrolyzed acid form of SMA, an ester form of SMA, or a half ester form of SMA.

4. The electrophotographic media of claim 1, wherein said cross-linkable resin comprises a composite film including a combination of SMA cross-linked with a copolymer of amine terminated PEO and amine terminated PPO.

5. The electrophotographic media of claim 4, wherein a ratio of SMA to amine terminated PEO/PPO ranges from 100:1 to 2.5:1.

6. The electrophotographic media of claim 1, further comprising a back supporting layer coupled to said base media.

7. The electrophotographic media of claim 6, wherein said back supporting layer comprises of calcium carbonate particles, polyethylene beads, or polymeric wax.

8. The electrophotographic media of claim 1, wherein said media exhibits a gloss level greater than 90% at 75 degrees and a gloss level greater than 30% at 20 degrees.

9. An electrophotographic media comprising:

a base media;

at least one sub-layer formed on a first side of said base media wherein said at least one sub-layer includes between 5 percent and 95 percent inorganic pigments by weight; and an image receiving layer formed on said at least one sub-layer;

wherein said image receiving layer includes a cross-linked resin formed from a combination of styrene maleic anhydride (SMA) cross-linked with amine terminated polyethylene oxide (PEO) or amine-terminated polypropylene oxide (PPO), or a copolymer thereof;

wherein said media exhibits a gloss level greater than 90 gloss units at 75 degrees and a gloss level greater than 30 gloss units at 20 degrees.

10. The electrophotographic media of claim 9, further comprising a back supporting layer coupled to said base media.

11. The electrophotographic media of claim 10, wherein said back supporting layer comprises calcium carbonate particles, polyethylene beads, or polymeric wax.

12. The electrophotographic media of claim 1, wherein said cross-linkable resin comprises a composite film including a combination of SMA cross-linked with amine terminated PEO.

13. The electrophotographic media of claim 1, wherein said cross-linkable resin comprises a composite film including a combination of SMA cross-linked with amine terminated PPO.

* * * * *